United States Patent

Thrasher et al.

[11] Patent Number: 5,915,722
[45] Date of Patent: Jun. 29, 1999

[54] COLLAPSIBLE CART

[75] Inventors: James D. Thrasher, 12 Kathryn Rd., Foxboro, Mass. 02035; Perry M. DiMascio, 20 Douglas Dr., Mansfield, Mass. 02048; Kevin G. Abelbeck, Venice; Paul C. Dickie, Clovis, both of Calif.

[73] Assignees: James D. Thrasher, Foxborough; Perry M. DiMascio, Mansfield, both of Mass.

[21] Appl. No.: 08/806,339

[22] Filed: Feb. 26, 1997

[51] Int. Cl.⁶ .................................................. B62B 1/00
[52] U.S. Cl. ................................................. 280/649
[58] Field of Search .................................. 280/651, 652, 280/638, 639, 35, DIG. 6, 654, 655, 659, 37, 47.17, 47.18, 47.24, 47.26, 47.315, 649, DIG. 3; 108/129, 132; 206/216, 335; 211/85, 132, 195; 248/129; D34/24

[56] References Cited

U.S. PATENT DOCUMENTS

| | | | |
|---|---|---|---|
| 3,191,958 | 6/1965 | Smith | 280/649 |
| 3,627,342 | 12/1971 | Morellet | 280/649 |
| 3,677,571 | 7/1972 | Maturo, Jr. et al. | 280/36 R |
| 3,693,993 | 9/1972 | Mazzarelli et al. | 280/30 |
| 4,055,357 | 10/1977 | Sorocin | 280/649 |
| 4,222,585 | 9/1980 | Crothers | 280/654 |
| 4,266,807 | 5/1981 | Griffin | 280/649 |
| 4,429,897 | 2/1984 | Friedman et al. | 280/646 |
| 4,703,944 | 11/1987 | Higson | 280/30 |
| 4,790,559 | 12/1988 | Edmonds | 280/655 |
| 4,865,346 | 9/1989 | Carlile | 280/654 |
| 4,887,837 | 12/1989 | Bonewicz, Jr. et al. | 280/654 |
| 5,197,754 | 3/1993 | Ward | 280/655 |

*Primary Examiner*—Lee W. Young
*Assistant Examiner*—C. T. Bartz

[57] ABSTRACT

The disclosed invention is a means of transporting items such as those commonly taken to the beach or on a picnic over sandy or otherwise yielding terrain. The device is comprised of a wheeled, collapsible frame including a bottom frame suitable for supporting larger objects such as an ice chest. The disclosed invention also includes an upper frame which supports a pliable receptacle that is of sufficient size to hold a multitude of miscellaneous items such as blankets, beach toys, clothes, food, etc. The invention includes a retractable chair hanger to support a plurality of folding chairs in a hanging fashion thereby providing a stable environment for transporting the chairs with little risk of loosing the chairs when traveling over rough terrain. The frame is such that it allows foldability to such an extent that it collapses to a size that can be easily stored and transported.

12 Claims, 6 Drawing Sheets

COLLAPSIBLE CART

BACKGROUND OF THE INVENTION

1. Field of the Invention

The invention herein relates to a collapsible hand propelled cart, and more particularly to an improved collapsible cart that is specially suited for moving objects over soft or otherwise yielding terrain such as sand at the beach.

2. Overview of Prior Art

A variety of art exists in the area of hand carts and even as it relates to beach travel, but all fall short of true functionality with respect to the end user. In U.S. Pat. No. 4,865,346 Carlile disclosed a wheeled collapsible cart assembly which includes a foldable lower frame, or bottom shelf, suitable for receiving an ice chest, and a pair of bracket arms extending behind the frame that could be used for placing folding chairs, but no receptacle is disclosed nor anticipated for transporting the many additional items taken to the beach such as blankets, toys, clothes, etc. In addition, the bracket arms are not practical because this storage means requires the chairs to sit on the horizontal portion of the arms. To move the cart the user pulls the handle back, tilting the device back and the chairs would easily fall out. This is exaggerated by the rough terrain this device is intended to travel over.

Carlile's disclosure shows a collapsible feature, but it is not without disassembly of the handle bar and the wheels. Removed parts are clumsy to transport and easily lost when the need to reassemble presents itself. The only functionally foldable portions are the bottom shelf and the bracket arms, but since the latter is lacking in utility, folding has no true advantage. In addition, because this disclosure has the cooler chest as a part of the claimed invention, it does not accommodate the variety of sized and shaped existing coolers or ice chests that individuals already own, not to mention containers other than coolers, such as picnic baskets and the like.

The beach cart as disclosed by Maturo, Jr. et al. in U.S. Pat. No. 3,677,571 has a receptacle for storage of miscellaneous supplies and a hanger for a beach chair, but still falls short of optimal functionality. First, the chair hangers are useful only with the style of chair shown in this art, and even then only for the one chair. When such a device is to be used, it is expected that a larger group, such as one or more whole families, would be using the device and therefore multiple chairs would be needed. Second the folding feature consists of nothing more than collapsing the receptacle by the four bar linkage of the frame. The reduction in overall storage and transport size such as in the car, is minimal. Finally, the wheel as disclosed and claimed is a cylindrical shell with a series of annular members which are supported by a plurality of longitudinal wires. The resultant might provide increased traction if the device was driven by the cylindrical wheel, but it is driven by the handle. The lugged affect of the wheel only increases the rolling friction of the wheel as it is pulled across the sand making it more difficult to use than a smooth wheel that offers minimal work requirement of displacement of sand.

In a similar manner, Bonewicz, Jr. et al. in U.S. Pat. No. 4,887,837 disclosed a pair of wheels that included a plurality of elongated cleats. As previously mentioned, such cleats only inhibit the function of the product. Although the disclosed device does have a folding platform and a bag to store articles, the bag is lacking in a structural support to enable adequate size so as to be truly useful. The folding feature is limited to the support platform and as such does not fold sufficiently to be considered truly collapsible.

Edmonds' utility carrier, as disclosed in U.S. Pat. No. 4,790,559 does show a smooth wheeled foldable carrier for transporting items over terrain such as sand at the beach. The frame supports only an unyielding load box of a size that must match the frame. This could be used to store an ice chest or cooler or as a receptacle for other articles, but not both. It would not be obvious to add structure for transporting additional items such as beach chairs or items that would be stored in a bag such as towels, toys, etc. Though the folding feature does not necessitate disassembly, it is not collapsible and it remains bulky and cumbersome.

In U.S. Pat. No. 4,703,944, Higson disclosed a wheeled beach caddy in the form of a chair. The device does fold, but it does not collapse. The platform folds up to the back, but the folding does not functionally go beyond that point. In addition there is not a receptacle or bag to hold additional items of miscellaneous sizes and shapes. There is a "C-shaped chair rack" to hold beach chairs but if the chairs are positioned completely on top of the rack and supported against the back, the transported chairs would potentially be very unstable, especially while traversing uneven terrain, as with the Carlile patent. The chairs could be hung from the rack, placing them in stable equilibrium and making them more secure. If the chairs could be made to fit on this device, the bottom platform could not be used to store and transfer items, because the chairs would be in the way. It is not obvious to add structure to include a means for carrying a variety of items in a storage bag.

Another alternative design is disclosed in U.S. Pat. No. 4,429,897 by Friedman, et al. Therein the issue of a receptacle for containing miscellaneous items is not disclosed nor anticipated, neither is an additional structure for holding chairs. It does not disclose a folding feature but instead a "slidable, transversely extending back". A potential consideration with such a method includes problems with tolerance build up that can make such a telescoping device difficult to use or even non-functional. Also the environments in which such a device may be used could subject the device to dirt and sand. Such abrasives do not mix well with a telescoping structure because only a small amount of this particulate could cause an interference between such mating parts, making the parts no longer able to slide one on the other. The total size of the device would not be reduced like one that is optimally foldable, thus making it more difficult to store when not in use. Also, the disclosed thin wheels are not suited to traversing sand or other yielding terrain.

Other disclosures include Ward in U.S. Pat. No. 5,197,754 and Crothers in U.S. Pat. No. 4,222,585 where a wheeled cart is disclosed including a receptacle or bag to store miscellaneous items. No bottom frame or platform is disclosed, nor a method for transporting items such as beach chairs. Ward claims a rigid frame which constitutes minimal folding for storage. In a comparable manner, Crothers disclosed a folding of the device but not any breaking of the frame with additional folding features that would make it collapsible, thereby minimizing the needed storage space. Here as disclosed in much of the previous art, the wheels are not suited for traversing sand or other yielding terrain.

Mazzarelli et al. disclosed a beach tote cart in U.S. Pat. No. 3,693,993 which can be used as a cot or lounging chair. The disclosure claims a pair of frames pivotally attached, with a rolling cylinder. No collapsible feature is disclosed. A mesh pocket, or nylon fabric webbing panel, is claimed to be used for storage of items, but it must double as a seat back when the device is used as a lounge chair. This necessitates the capacity of the receptacle to be small in comparison to the size necessary to be truly functional. Also with such a design the items must be strapped in, as is disclosed. This results in an inconvenience to the user. If a supporting shelf or frame and bag type receptacle is made available, tie downs could many times be eliminated.

SUMMARY OF THE INVENTION

The object of the disclosed invention is to provide a means of transporting items in a convenient manner, such as those commonly taken to the beach or on a picnic. The device is comprised of a wheeled, collapsible frame work including a bottom frame suitable for supporting larger objects such as an ice chest. The disclosed invention also includes an upper frame which supports a pliable receptacle that is of sufficient size to hold a multitude of miscellaneous items such as blankets, beach toys, clothes, food or virtually anything else that would be considered common place at the beach or on a picnic with family and friends. The device also includes a retractable chair hanger to support a plurality of folding chairs in a hanging fashion thereby providing a stable environment for transporting the chairs with little risk of losing the chairs even when traveling over rough terrain. The frame allows foldability to such an extent that it collapses to a size that can be easily stored and transported.

DETAILED DESCRIPTION OF THE PREFERRED EMBODIMENT

Figure 1:
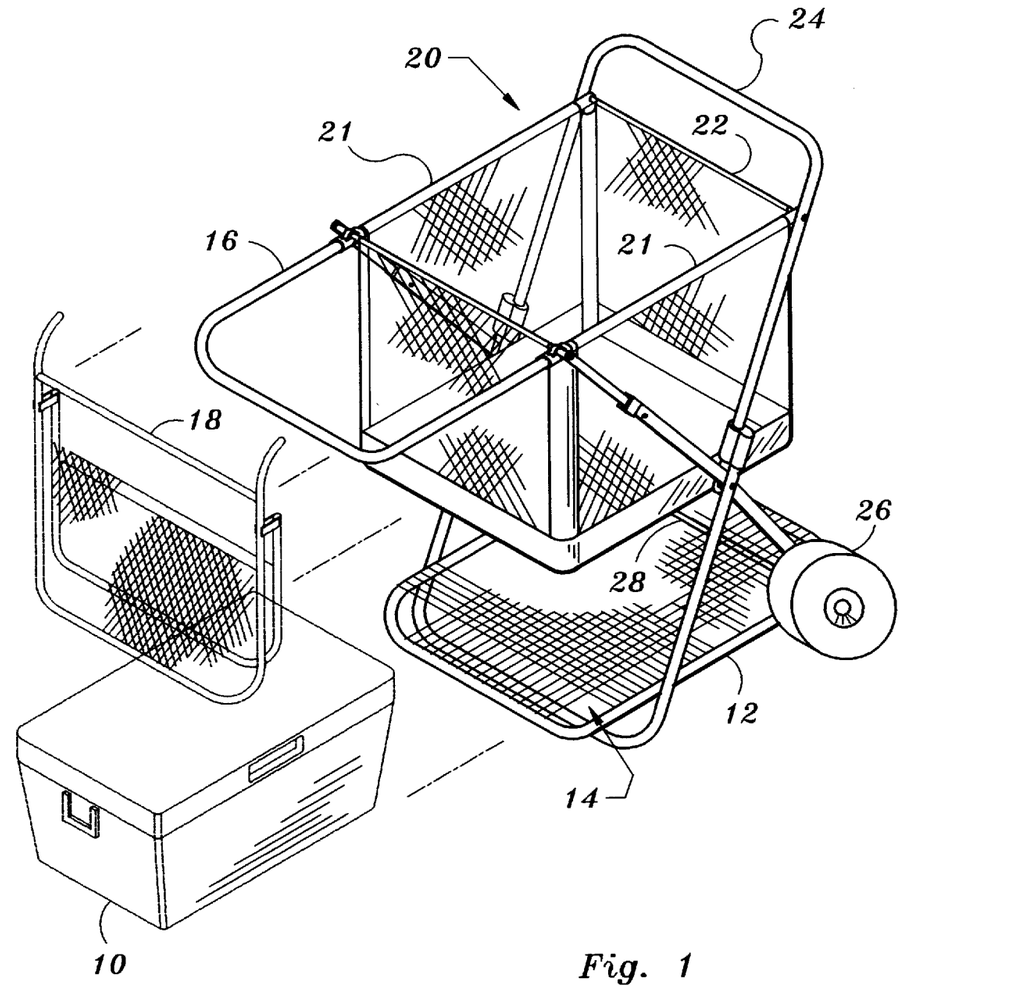
FIG. 1 is a prospective view of a collapsible cart produced in accordance with the preferred embodiment of the present invention and also accessories for transporting thereon.

Ever since the attraction of families to sea shores and other recreational areas, the problem of transporting the appropriate necessities has ensued. For example, often times, far off parking accompanied with long stretches of beach, make transporting items to the waterfront difficult at best. When the beach-goers plan to spend the day in the sand and surf, an array of accessories are necessary to accompany this journey. Beach towels, blankets, drinks, beach chairs, lotion, an umbrella, and a change of clothes are just some of the more common items. To transport such items a carrier or cart is necessary, such as is shown in FIG. 1. Herein is disclosed a wheeled cart suitable for transporting an item such as an ice chest 10 by placing it on a lower frame 12 of the cart. The lower frame 12 is shown here to be covered with a lightweight mesh material which could be manufactured from a variety of materials including polyester, nylon, other thermoplastics; synthetic or natural rubber; or cotton, the lower frame constitutes a support platform 14. This platform could be comprised of structural cross braces (not shown) but this would add extra weight and cost where a material securely fastened to the bottom frame 12 would function just as well.

The cart also includes a chair hanger 16 suitable for hanging folding chairs 18 thereon. The chairs 18 hang with their center of gravity below the hanger 16 thereby keeping the chairs 18 in stable equilibrium thereby preventing them from falling off the hanger 16 when the cart is traversing rough terrain.

The cart has an upper frame 20, which is comprised of a pair of side rails that support a receptacle 22, shown here in the form of a bag. This receptacle 22 could be made from a similar material as the support platform 14, in that a mesh material is preferable. The pliable nature of the material is useful in that it can collapse when the cart is folded into the collapsed configuration, as will be further disclosed.

A handle 24 is used to grasp by the user, tilt the cart back on the wheels 26, the axial 28 being mounted to the lower frame 12, and push or pull the cart as needed. The wheels 26 are of sufficient width to allow the cart to be pulled over even soft sand when the device is loaded. The wheels are also smooth annularly, treadless, thereby minimizing the work of displacement of the sand when the cart is traveling over same. A lugged or distorted annular surface increases the rolling friction of the wheel on the sand which is undesirable because the cart is not driven through the wheels 26 but by the handle 24.

Figure 2:
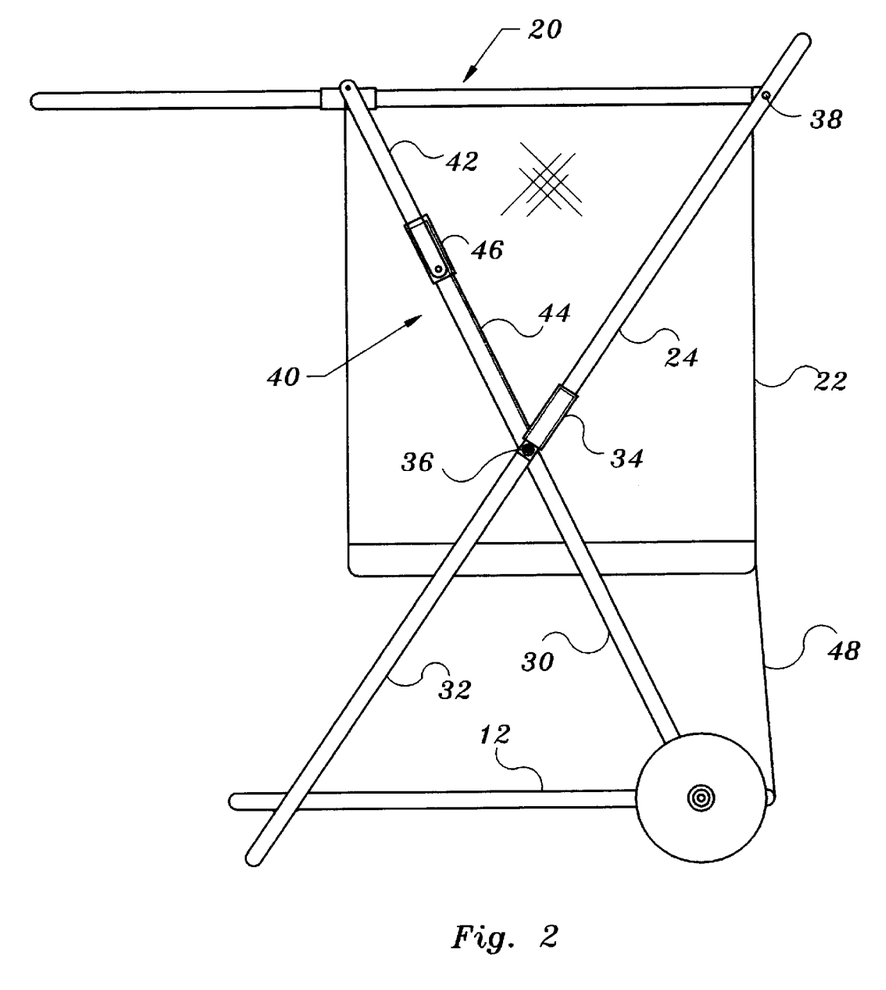
FIG. 2 is a side view of a collapsible cart produced in accordance with the preferred embodiment of the present invention.

A side view of the cart is shown in FIG. 2, which further discloses the preferred embodiment of an X-type frame, which allows structural support and maximal collapsibility of the cart. The lower frame 12 and upper frame 20 are supported by a rear leg 30, a front leg 32, which is removably secured to the handle 24 by use of a handle locking means 34. Here the handle locking means 34 is shown to slide on the handle 24 and receive the end of the front leg 32 securing one to the other when they are pivotally rotated in alignment around a pin 36. The upper frame 20 is pivotally attached to the handle 24 by an upper pin 38 and further supported by a frame gusset 40.

To further accommodate the collapsible nature of the cart the frame gusset 40 is shown here to be comprised of an upper gusset 42, pivotally attached to the upper frame 20; a lower gusset 44, pivotally attached to the handle 24 and a gusset lock 46 capable of locking and unlocking the upper gusset 42 and the lower gusset 44 in a secured position. Here the upper gusset 42 and the lower gusset 44 are pivotally attached and the gusset lock 46 is slidably mounted on the upper gusset 42 enabling the lock to engage the lower gusset 44 as well when both gussets are aligned with respect to each other.

The receptacle 22 is shown here to be prevented from excessive displacement by the back support 48 which is fastened to the bottom edge of the receptacle 22 and the rear of the bottom frame 12. The back support 48 has multiple functions in that it acts to prevent a large item located on the bottom frame 12 (such as an ice chest) from sliding out the back of the cart when the cart is tilted back, as it would be when in use. When the cart is in this in use position as shown, the back support 48 is tensioned along with the back of the receptacle 22 which is attached to the back of the side rails 21 of the upper supports 20. This tension adds structural rigidity to the frame, making it more stable by providing tension between the bottom frame 12 and the receptacle 22, as shown here. The preferred embodiment would possibly not have the bottom frame extending beyond the back of the wheel, as shown here, but is here to graphically depict the attachment of the back support 48 to the bottom frame 12. Dimensional adjustments such as these are considered to fall within the scope of the disclosure.

Figure 3:
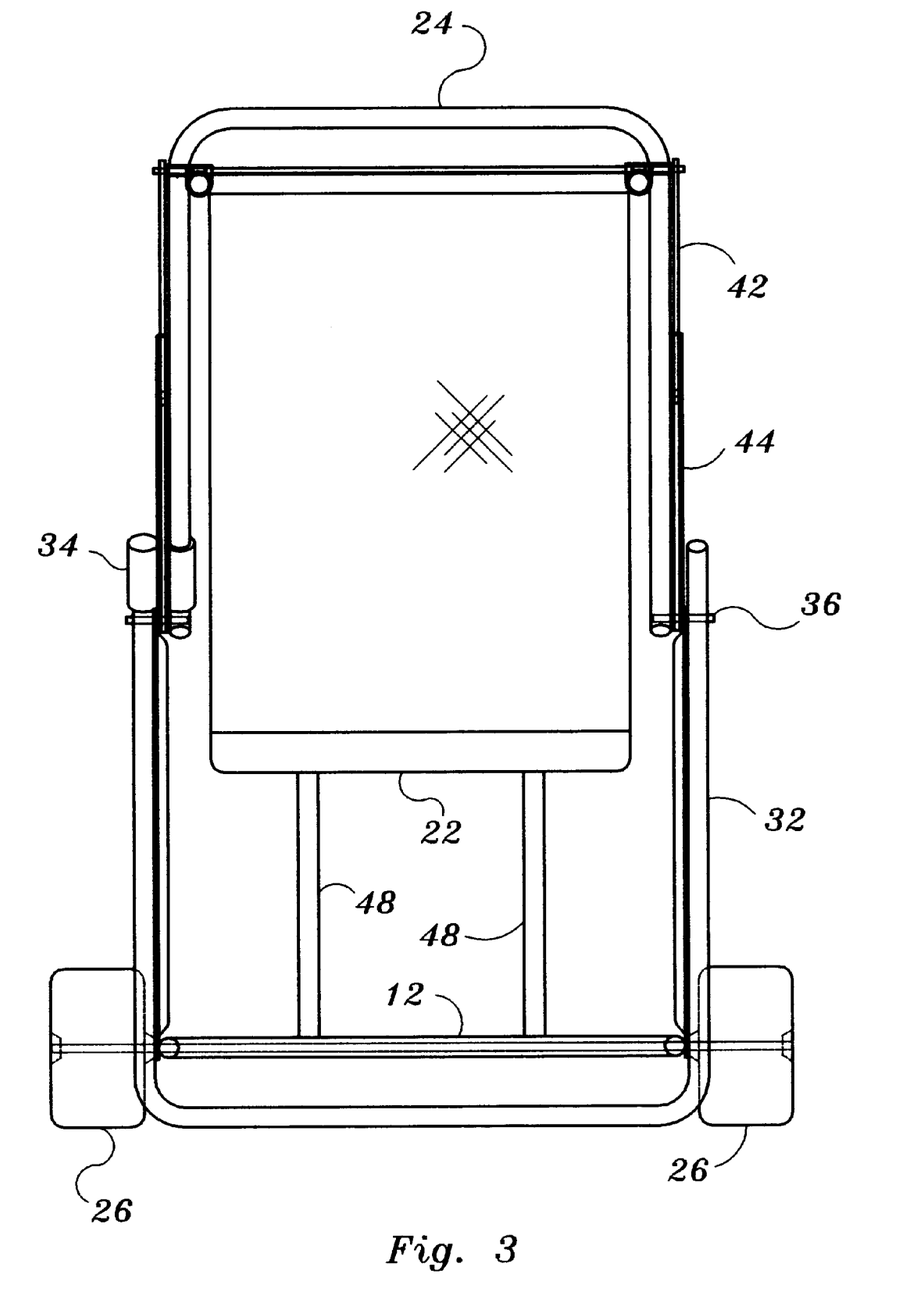
FIG. 3 is a front view of a collapsible cart produced in accordance with the preferred embodiment of the present invention.

The cart is further shown in the front view as depicted in FIG. 3. Here the upper gusset 42 and the lower gusset 44 are shown to be positioned as a spacer between the handle 24 and the front leg 32. The pin 36 is shown here to attach the gusset 44, the handle 24 and the front leg 32. The gusset 44 does not necessitate attachment here but is suggested by efficiency of manufacturing. The handle locking means 34 has been removed from one side to show detail. The back support 48 is shown here to be two parallel strips connecting the receptacle 22 to the bottom frame 12. The preferred embodiment would suggest these strips be manufactured of a cloth webbing such as cotton or nylon, but the material, number of strips and configuration are not critical to the novelty of the invention. As such, all combinations are considered obvious and therefore not further disclosed.

Figure 4:
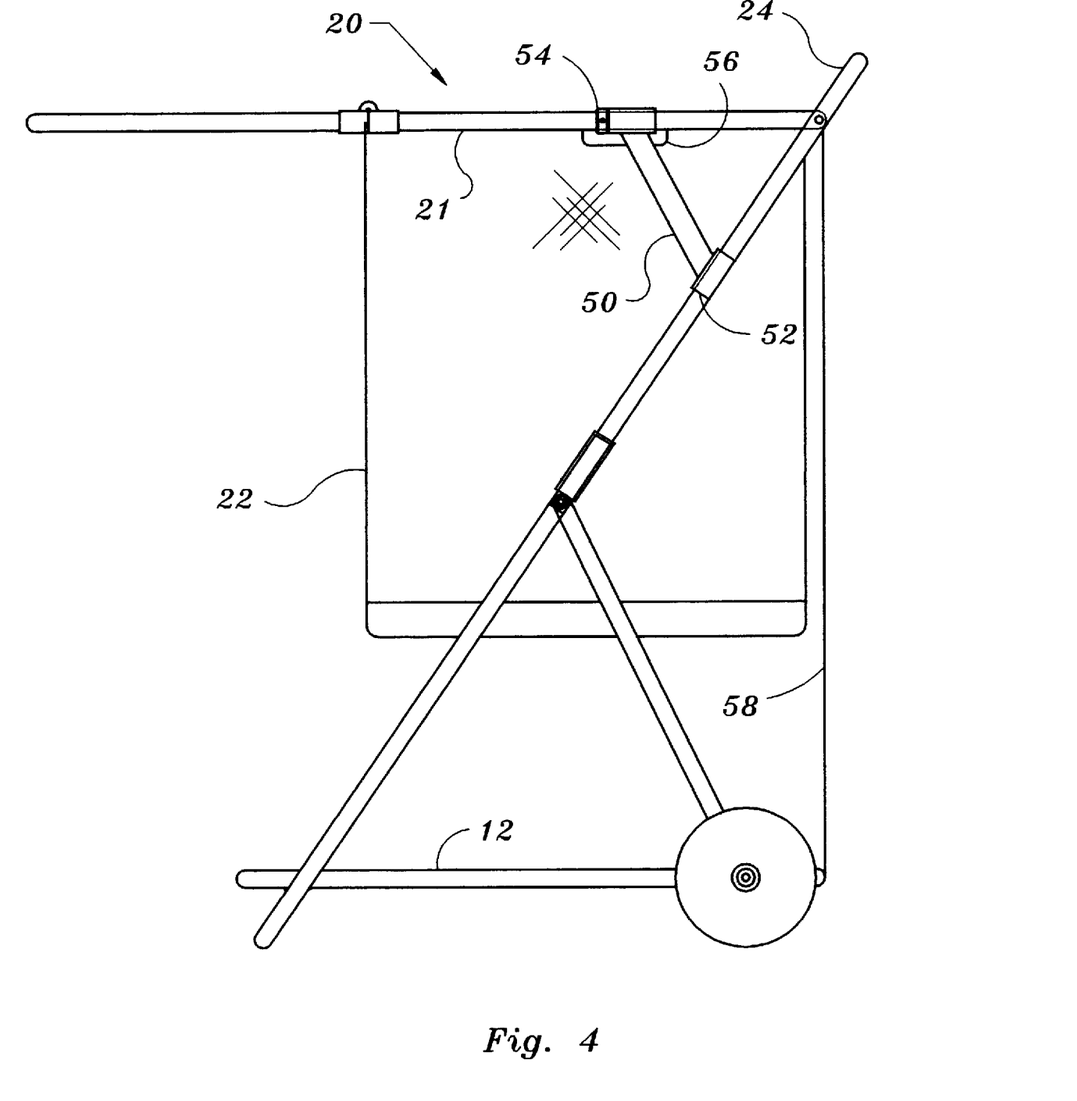
FIG. 4 is a side view of a collapsible cart showing an alternative frame gusset, the cart produced in accordance with the preferred embodiment of the present invention.

What is shown in FIG. 4 is a modification to the preferred embodiment specifically regarding the frame gusset 40 in FIG. 3. FIG. 4 shows the same upper frame 20 being supported from the handle 24, only here by use of a rigid gusset 50. Here the rigid gusset 50 is rotateably mounted to the side rails 21 of the upper frame 20. The other end of the rigid gusset 50 is in the form of a clip 52, which is removably received by the handle 24, thereby allowing rigid support and the ability to remove the structure for disassembly. A retaining ring 54 is secured to the side rail 21 to prevent forward movement of the gusset 50 when the upper frame 20 is loaded. The receptacle 22 includes a cutout 56 to allow the gusset 50 to be mounted on the side rail 21. The invention would work equally well with the gusset 50 rotatably mounted on the handle 24 with the clip 52 on the side rail 21 of the upper frame 20 or to have both ends of the gusset 50 removably attach onto their respective structures such as with the clip 52.

Also in FIG. 4 is shown an alternative to the back support 48 (as shown in FIG. 3). Here the long support 58 spans the distance from the lower frame 12 to the upper frame 20, running parallel to the vertical portion of the receptacle 22. As with the previous method, the long support 58 limits the movement of the receptacle 22, secures items on the lower frame 12 when same is in a tilted back position, and adds rigidity to the cart through tension in the support 58 between the frame members.

Figure 5:
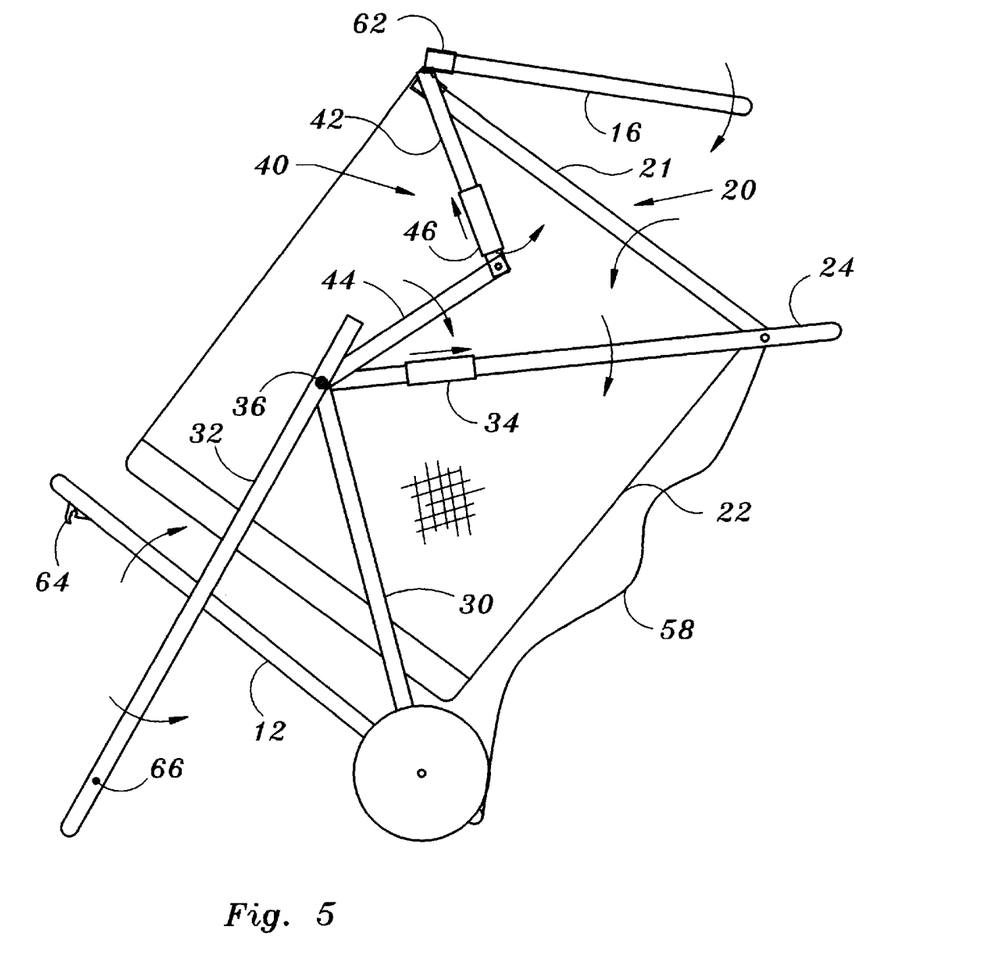
FIG. 5 is a side view of a collapsible cart being broken down, thereby showing the folding feature, the cart produced in accordance with the preferred embodiment of the present invention.

The collapsibility of the device is vitally important in the usefulness as it pertains to storage and transporting to where it is to be used. The smaller the space the device takes up when not in use the better. FIG. 5 shows the cart as all members would be collapsed to fold up. Arrows show the direction of rotation of the components as well as movement to disengage the respective locks. The chair hanger 16 is rotated back onto the upper frame 20 by use of a pair of pivoting caps 62, one cap on the end of the side rail 21 of the upper frame 20 and the other on the end of the chair hanger 16, both having a common axis to pivot thereon. The rigid gusset (on FIG. 4) would be disengaged or, as shown here, the gusset lock 46 slid up to unlock the frame gusset 40 allowing the upper gusset 42 to rotate toward the upper frame 20 and the lower gusset 44 to rotate toward the handle 24. Due to the pivotal attachment of the upper gusset 42 to the lower gusset 44, their respective movement can only happen providing the upper frame 20 rotates down toward the handle 24. This entire assembly is now free to rotate around the pin 36 toward the rear leg 30 after disengagement of the handle locking means 34 from the front leg 32 by sliding it on the handle 24 away from the front leg 32.

The upward movement of the lower frame 12 reveals a lower locking means 64 which is fastened to the bottom of the lower frame 12 and receives a locking pin 66 which is mounted to the inside of the front leg 32. This locking means combination secures the bottom frame to the front leg as well as further stabilizes the entire structure in its assembled state. When the lower locking means 64 is disengaged from the locking pin 66 the lower frame 12 and the front leg 32 are able to also rotate toward the rear leg 30, the receptacle 22 and the long support 58 both being of a pliable material, thereby the whole structure folding into a collapsed state.

Figure 6:
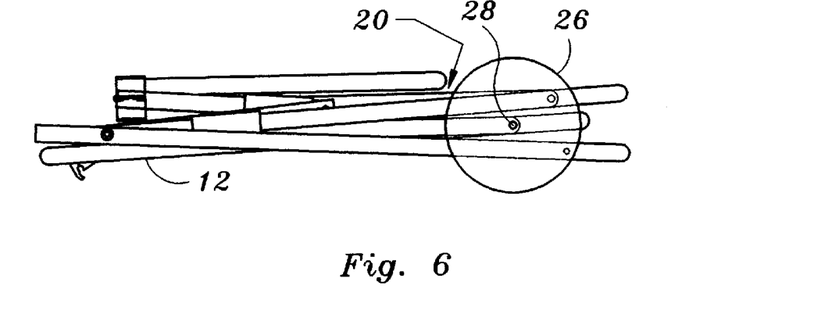
FIG. 6 is a side view of a collapsible cart when folded, the cart produced in accordance with the preferred embodiment of the present invention.

The final collapsed state of the cart is shown in FIG. 6. The receptacle is not shown in that it would be collapsed between the upper frame 20 and the lower frame 12. The wheels 26 can remain on the axial 28 but also can be removed if even more reduced storage space is required. Though the preferred embodiment does not include the removal of the wheels 26, the inventors acknowledge the potential usefulness of such a feature and therefore reserve the right to include such a feature as being disclosed herein.

Figure 7:
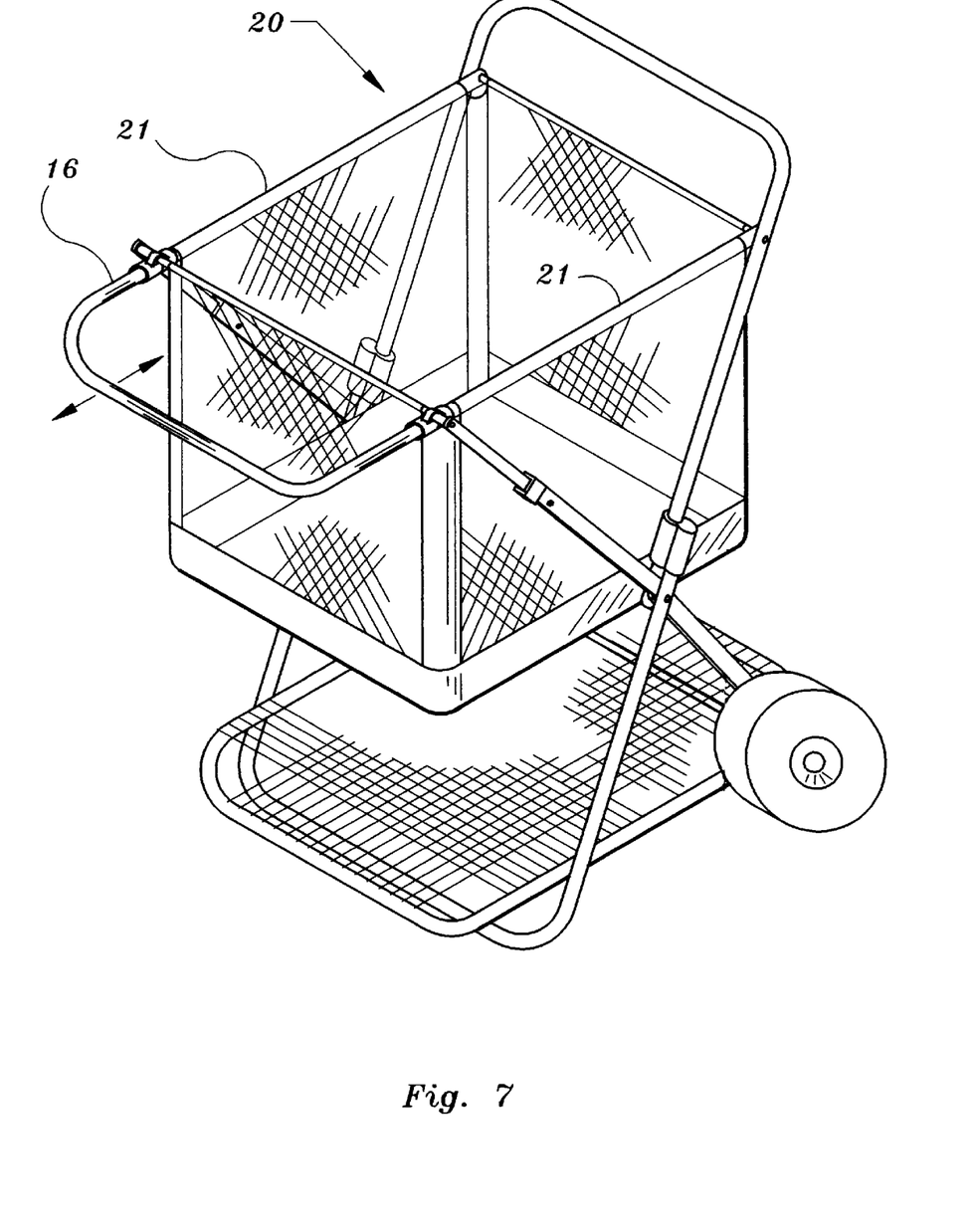
FIG. 7 is an isometric view, showing a telescoping feature of the chair hanger of a collapsible cart produced in accordance with the preferred embodiment of the present invention.

A similar version to the previously disclosed as shown in FIG. 7, the alteration being in the chair hanger 16. Here the chair hanger 16 is shown to telescope from the side rails 21 on the upper frame 20 rather than be pivotally mounted. This does not alter the function of the invention, only the method of storage of the chair hanger 16 when it is not in use.

What is claimed is:

1. A collapsible cart comprising:

a pair of wheels rotateably attached to a lower frame, the lower frame including a platform, the platform being capable of supporting an object such as an ice chest and the lower frame also including a lower locking means attached thereto;

at least one rear leg having one end pivotally attached to said lower frame and the other end pivotally attached to a front leg, the front leg also including at least one locking pin;

a handle with one end pivotally attached to said front leg;

an upper frame comprised of two substantially parallel side rails, each rail being pivotally attached to said handle toward the opposite end of said front leg;

at least one frame gusset joined to and disposed away from the pivotally attached end of said upper frame and supported by said handle;

a receptacle, the upper end being open and supported by said parallel side rails;

a back support attached to the lower frame and the upper frame, thereby limiting movement of one to the other; and a handle locking means to secure said handle in a predetermined position with respect to said front leg, whereby when said lower frame is positioned substantially parallel to a supportive surface and supported thereon by said wheels, with said front leg and said handle secured one to another in a distended position, and said upper frame being pivotally displaced from said handle and limited by said back support, the lower locking means receiving said at least one locking pin, the combination made rigid also with said frame gusset, thereby placing said receptacle in an open position, the combination being suitable for accommodating and transporting objects over terrain consistent with the soft sand of a beach, and when empty, the combination can be folded such that said handle, front leg, upper frame, lower frame and said at least one rear leg can be pivotally manipulated to be in close proximity to one other, thereby collapsing into a minimal space for easy and convenient storage.

2. The collapsible cart as described in claim 1, wherein said wheels are of sufficient width so as to enable the cart to locomote on soft sand or a yielding terrain.

3. The collapsible cart as described in claim 1, further comprising a chair hanger extending from said side rails of said upper frame, whereby a plurality of objects such as beach chairs can be supported thereon and the chair hanger can be retracted when not in use to minimize storage space.

4. The collapsible cart as described in claim 2, wherein said chair hanger is comprised of at least one member that telescopes from each of said side rails.

5. The collapsible cart as described in claim 2, wherein said chair hanger is comprised of at least one member being pivotally mounted to the end of said upper frame, away from said handle, whereby the at least one member can be positioned adjacent to said upper frame for storage and moved to be positioned in a distended position thereto for supporting a plurality of objects such as folding chairs.

6. The collapsible cart as described in claim 1, wherein each said at least one frame gusset is comprised of a rigid member, being removably secured to at least one frame member, the frame members including said upper frame and said handle, thereby being capable of providing displacement between said upper frame and said handle.

7. The collapsible cart as described in claim 1, wherein each said at least one frame gusset is comprised of an upper gusset which is pivotally attached to a lower gusset, the other end of the upper gusset being attached to said upper frame and the lower gusset being attached to said handle, and a gusset lock being capable of securing the upper gusset to the lower gusset.

8. The collapsible cart as described in claim 1, wherein said lower frame is further comprised of at least two substantially parallel lower rails with a support platform there between.

9. The collapsible cart as described in claim 8, wherein said support platform is further comprised of a material selected from the group consisting of polyester, nylon; and cotton.

10. The collapsible cart as described in claim 1, wherein said receptacle is comprised of a bag constructed of a resilient material.

11. The collapsible cart as described in claim 10, wherein said resilient material is a material selected from the group consisting of polyester, nylon,; synthetic rubber and natural rubber; and cotton.

12. The collapsible cart as described in claim 1, wherein said back support is further comprised of a resilient material that is fastened to said lower frame and the bottom area of said receptacle, said receptacle being attached to said upper frame, the combination thereby limiting movement of said upper frame from said lower frame while restricting the movement of said receptacle.

* * * * *